United States Patent [19]
Albert

[11] Patent Number: 4,656,383
[45] Date of Patent: Apr. 7, 1987

[54] VIBRATING BEAM FORCE TRANSDUCER WITH SINGLE ISOLATOR SPRING

[75] Inventor: William C. Albert, Parsippany, N.J.

[73] Assignee: The Singer Company-Kearfott Division, Little Falls, N.J.

[21] Appl. No.: 829,728

[22] Filed: Feb. 14, 1986

[51] Int. Cl.[4] .......................................... H01L 41/08
[52] U.S. Cl. .................................... 310/321; 310/312; 310/323; 310/329; 310/367; 73/517 AV
[58] Field of Search ............... 310/321, 323, 324, 338, 310/367, 368, 361, 25, 330-332, 329; 73/778, 777, 781, 141 R, DIG. 1, DIG. 4, 517 R, 517 AV; 338/2, 47; 357/26

[56] References Cited

U.S. PATENT DOCUMENTS

| | | | |
|---|---|---|---|
| 3,238,789 | 3/1966 | Erdley | 73/517 |
| 3,269,192 | 8/1966 | Southworth et al. | 73/517 |
| 3,399,572 | 9/1968 | Riordan et al. | 73/398 |
| 3,413,859 | 12/1968 | Riordan | 74/5.4 |
| 3,440,888 | 4/1969 | Southworth et al. | 73/517 |
| 3,465,597 | 9/1969 | Riordan et al. | 73/517 |
| 3,470,400 | 9/1969 | Weisbord | 310/323 X |
| 3,479,536 | 11/1969 | Norris | 310/8.5 |
| 3,486,383 | 12/1969 | Riordan | 73/517 |
| 3,505,866 | 4/1970 | Weisbord et al. | 73/141 |
| 3,969,640 | 7/1976 | Standte | 310/911 |
| 4,104,920 | 8/1978 | Albert et al. | 73/517 AV |
| 4,221,131 | 5/1979 | Albert | 73/517 AV |
| 4,321,500 | 3/1982 | Paros et al. | 310/323 X |
| 4,377,765 | 3/1983 | Kogure et al. | 310/312 |
| 4,445,065 | 4/1984 | Albert | 310/323 X |
| 4,446,394 | 5/1984 | Albert | 310/321 |
| 4,447,853 | 5/1984 | Ochiai | 310/312 |
| 4,544,858 | 10/1985 | Nishiyuchi | 310/321 |

OTHER PUBLICATIONS

Serra, Technical Report on the Quartz Resonator Digital Accelerometer, AGARD Conference, May 1968, pp. 487-516.
Albert, Vibrating Quartz Crystal Beam Accelerometer, ISA, 1982, pp. 33-44.
Albert, Force Sensing Using Quartz Crystal Flexure Resonators, IEEE, 1984, pp. 233-239.
Albert et al., Vibrating Beam Accelerometer for Strapdown Applications, IEEE, 1982, pp. 319-322.
Albert, Single Isolator Beam Resonator, Jul. 1978.
Albert, Quartz Crystal Flexure Resonator, 1985.

Primary Examiner—Mark O. Budd
Attorney, Agent, or Firm—Pennie & Edmonds

[57] ABSTRACT

A force transducer having a vibratory member either a beam or a string and means for effectively isolating the vibratory member from its end mounts over the range of its operating frequencies to eliminate energy loss to the mounts. The axial stresses, either tension or compression, are directly transferred to the vibratory member to affect its natural resonant frequency. Isolation at vibration frequencies is effected by the cooperation of combined isolator masses and isolator springs with the vibratory member. The isolator masses comprise two bars extending from each end support of the vibratory member, each being coextensive with a portion of the support member. The pairs of masses are axially separated. The isolator springs comprise two single thin, spaced resilient members, each isolator spring connecting a single end support of the member and a single transducer end mount.

18 Claims, 3 Drawing Figures

VIBRATING BEAM FORCE TRANSDUCER WITH SINGLE ISOLATOR SPRING

BACKGROUND OF THE INVENTION

This invention relates to vibratory members such as beams or strings and more particularly to isolator means for isolating the vibrations of the vibratory member from its mounts to minimize coupling between the member and its mounts over the range of its frequencies of vibration.

In certain apparatus such as vibrating beam or string accelerometers or pressure transducers, a vibratory member is supported in such a way that forces of acceleration, deceleration or pressure are applied at the ends of the apparatus to change its axial stresses. In an axially unstressed condition, a beam has a certain natural frequency of vibration, determined primarily by its dimensions, the material of which it is constituted, temperature, and the media in which it is operating. In response to an axial stress applied to the beam, the natural frequency of vibration of the beam changes—the frequency increasing in response to axial tension and decreasing in response to axial compression. Similarly, in the case of a vibratory string apparatus, the string is prestressed a predetermined amount greater than the forces of compression it is intended to measure. In such a condition, the beam or string has a certain natural resonant frequency. Axial forces of either compression or tension applied to the ends of the apparatus produce changes in this natural frequency of vibration indicative of the forces so applied.

It is, of course, desirable that the vibration frequency of the vibratory member of the transducer be a true and accurate representation of the axial stress applied to it so that accurate measurements can be obtained. However, in prior art force transducers of this type, this is not the case due to the necessary condition that the vibratory member must be mounted. Mounting the vibratory member, however, permits energy to be lost from the vibratory member to the mounts, thereby making the force transducer as a whole less efficient. This loss of energy results in a decrease in the Q factor of the transducer, that is, the ratio of energy stored in the vibratory system of the force transducer to the ratio of energy lost.

It is desirable to maintain a high Q factor for several reasons. First, in order to operate the force transducer, the vibratory member must be caused to vibrate. Typically, this requires electrical energy. If too much vibratory energy is lost by the vibratory system during operation, relatively high levels of electrical energy must be used in order to maintain a constant level of operation. Such high levels of electrical energy can, however, have detrimental effects to the transducer itself or to other devices located nearby. Additionally, if high levels of electrical energy are required, variations or errors in the electrical power signal will cause larger frequency deviations of the vibratory member thereby resulting in reduced accuracy of the transducer. Second, in the event that the source of electrical energy is momentarily and unexpectedly disconnected, the inability of the transducer to maintain vibratory energy for the time the power is disconnected will cause the vibrations of the vibratory member to dampen quickly, so that when electrical power is restored, inaccurate frequency readings will result.

In a single vibratory member resonator, the vibratory member is directly coupled to the mount. As a result, the frequency of the resonant member is affected by any structural resonances of the member to which the member is mounted. This effect can further seriously degrade the operation of the member. It can limit its operational frequency range and degrade its frequency stability. Moreover, the resonant member becomes sensitive to external vibrations imposed on the housing at any of the housing resonant frequencies; and its temperature coefficient of frequency is affected by the housing temperature coefficient.

One proposal which has been offered to overcome the disadvantages noted above has been the double vibrating member structure wherein the members theoretically vibrate in a push-pull type of action. An attempt is made to construct two members, either beams or strings, identical in size, and the members are mounted parallel to each other. Ideally, the vibrations are such that the members move either simultaneously toward or away from each other whereby end effects are cancelled. However, as a practical matter, the double resonator as an axial stress measuring unit has operating difficulties when an external axial load is applied. If the two members are not loaded equally, the frequency shift due to the externally applied load will be unequal. Under these conditions, there will not be a single well-defined resonant frequency but rather two, one for each member. The existence of two resonant peaks can change the frequency versus load characteristic and can sometimes result in the electronic drive circuitry gain of the vibrating members falling to less than one. This results in the failure of the oscillator loop circuitry to maintain vibrations of the members. Moreover, the beneficial cancelling effects of the double member configuration are dependent on closely matching the dimensions of the two members. If matching is not very close, the cancellation benefits decrease.

Accordingly, under ideal circumstances, the vibratory member's vibration and its changes in vibration should be totally uninfluenced by its mounts so that its changes in vibration would be directly related to the axial stresses applied to it. In such a case, an accurate, reliable accelerometer or other instrument free of interference from its supports could be implemented.

In U.S. Pat. No. 3,470,400 entitled Single Beam Force Transducer With Integral Mounting Isolation which is assigned to the present assignee and is incorporated herein by reference, a force transducer is disclosed in which two isolator masses are used to minimize coupling between the vibratory member of the transducer and the transducer mounts. The isolator masses are connected to the mounts by pairs of spring members. In order to increase the efficiency of the transducer and thereby increase the Q factor, the isolator masses are constructed so that their centers of gravity lie on an axis coincident with the axis of the vibratory member. As a result, the vibrations of the vibratory member are effectively cancelled by the vibrations of the isolator masses so that only a small portion of the vibratory energy of the vibratory member is transmitted to the mounts.

Although this device of the '400 patent is operational and provides satisfactory results, the Q factor of the transducer is not sufficiently high for certain applications. This is due, it is believed, to the fact that too much energy is lost by the vibratory member to the transducer mounts because the isolator masses are not permitted to vibrate freely enough. Since the supports to which the isolator masses are mounted are connected to the end mounts in two places by the two springs, the two springs restrict rotation of the isolator masses. Specifically, referring to FIG. 3 of the '400 patent, the double spring configuration prevents the isolator masses from rotating between the positions shown in broken lines. Although, in theory, the isolator masses would not need to rotate significantly since their shape and position are chosen to eliminate all such vibrations, in reality, such accurate tuning is difficult to attain because of the precise geometrial conditions that must be met. Additionally, having an isolator mass geometry that satisfies the conditions necessary for perfect tuning usually results in other problems such as low isolator stiffness, spurious resonances or both. As a result of such mistuning, the isolator masses will tend to rotate. The double spring arrangement will restrict such rotation thereby allowing too much vibrational energy to be transferred from the vibratory member to the mounts of the transducer and thereby reducing the Q factor.

SUMMARY OF THE INVENTION

The present invention is an improvement of the device disclosed in the '400 patent. In accordance with the present invention, mechanical isolation or decoupling between a vibratory member and its end mounts is effected by cooperative action between isolator masses and isolator springs associated with the vibratory member. The vibratory member is secured at each end to a pair of supports; and the isolator masses comprise two pairs of massive elements, one pair secured to respective ends of each of the vibratory member's supports and extending therefrom coextensively with a portion of the vibratory member so that the center of gravity of each pair as an entity is within or projects upon the vibratory member. The isolator springs comprise thin, elastic elements connecting the vibratory member supports with the transducer mounts on each end of the entire unit. Instead of using double springs to connect each support with each mount as disclosed in the '400 patent single springs are used. The isolator masses and springs form resonant combinations driven into vibration by the end forces and moments of the vibratory member. By properly proportioning the masses and springs according to the properties of the vibratory member, the member can be nearly totally decoupled from its mounts at the frequencies of vibration of the vibratory member. In a preferred embodiment of the invention, the vibratory member comprises a beam.

Using single springs to connect the vibratory member supports and the end mounts allows the isolator masses to rotate and translate when the transducer is in operation while additionally reducing the forces transmitted to the end mounts. As a result of this improved single spring design, the entire isolator mass-vibratory member system vibrates in a manner closer to its free mode (as if the entire vibration system were vibrating suspended in space) than in prior art devices, even when the force transducer has been fabricated so that it is slightly mistuned. In particular, the single spring design reduces the amount of vibrational energy that is transferred from the vibratory member to the end mounts when all the isolator masses are exactly the same in a symmetric structure where the center of gravity is located as disclosed in the '400 patent and also when the isolator masses are not exactly the same resulting in a mistuned, asymmetric structure where the center of gravity is not located as disclosed in the '400 patent. Such asymmetric structures can occur accidentally such as by manufacturing inaccuracies or can be used intentionally. Such an asymmetric isolator mass design adds to the vibration isolation effect since the untuned vibration of the asymmetric isolator mass pairs acts as a barrier to the transmission of vibrations of the vibratory beam to the end mounts. The single spring design of the present invention allows the isolator mass pairs to vibrate more freely than in the double spring design of the '400 patent thereby reducing transmission of vibrations from the vibratory beam to the end mounts.

BRIEF DESCRIPTION OF THE DRAWING

These and other objects, features, elements, and advantages will be more readily apparent from the following description of the invention in which.

DESCRIPTION OF THE PREFERRED EMBODIMENT

The present invention is equally applicable to vibratory apparatus having vibratory beams or vibratory strings; however, for simplicity and clarity, its application as a vibratory beam apparatus only, will be described in detail, it being understood that generally the same or similar principles apply in the case of a vibratory string apparatus.

Figure 1:
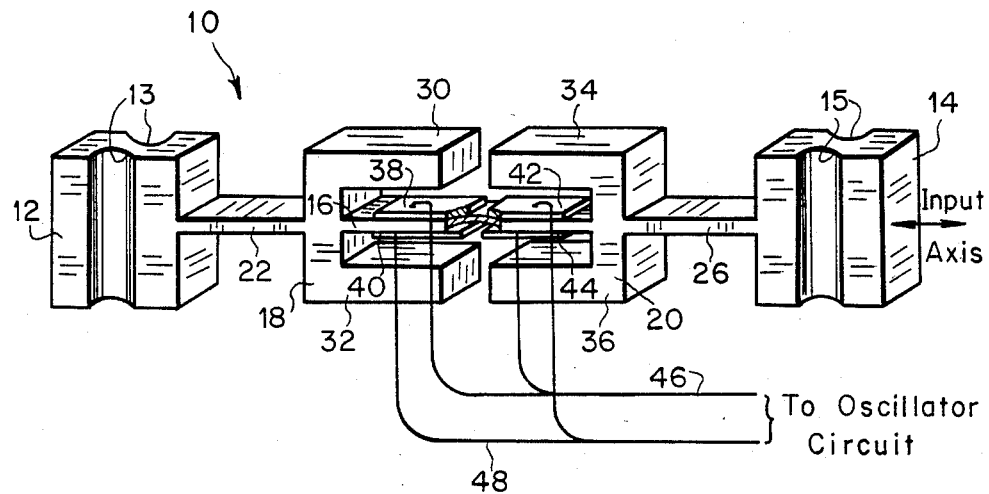
FIG. 1 is a perspective view of the vibrating beam transducer according to one embodiment of the present invention.

Referring the vibrating beam force transducer shown in the perspective view of FIG. 1, 10 represents generally an entire vibratory beam transducer of the present invention, including a pair of end mounts 12 and 14 which may be respectively recessed at 13 and 15 to form cross axis hinges and to which supporting members are attached and to which axial forces are applied along an input axis designated, when the unit is used as a force measuring unit used to measure acceleration, pressure or other forces. The transducer 10 includes a vibratory beam 16 extending between and secured to respective support members 18 and 20. The vibratory beam thus has a longitudinal axis extending between support members 18 and 20.

For decoupling or isolating the beam from mounts 12 and 14 at beam operating frequencies, support members 18 and 20 are connected to respective mounts 12 and 14 by thin single spring members 22 and 26. Pairs of isolator masses 30 and 32 and 34 and 36 extend from respective supports 18 and 20 co-extensively with a portion of the vibratory beam 16. The particular lengths and other dimensions of the isolator masses are correlated with the vibratory beam properties, however, in all events isolator masses 30 and 34 are axially spaced and isolator masses 32 and 36 are similarly axially spaced. Axial stresses, either tension or compression, applied to the end mounts 12 and 14 are transmitted to the vibratory beam 16 through the thin spring members 22 and 26.

The transducer 10 may be formed from a single block of any suitable material including metal. However, for the sake of clarity, the invention will be set forth as applied to a transducer made of quartz or other piezoelectric material wherein to form the particular configuration shown and described, material is cut away by any suitable well-known procedure.

For driving the vibratory beam 16 in the body shear mode, pairs of electrodes 38 and 40 are attached to opposite sides of the vibratory beam along one axial extent and another pair of electrodes 42 and 44 are attached to opposite sides of the vibratory beam 16 along another axial extent. Preferably, electrodes 38, 40, 42 and 42 are comprised of a high conductivity material such as metal which is attached to the vibratory beam by methods known in the art. The thickness of the electrodes must not be so great as to restrict vibration of the vibratory beam 16. An electronic oscillator, not shown, provides driving excitation for the vibratory beam and leads 46 and 48 from the electronic oscillator are connected to the electrodes. Lead 46 is connected to electrodes 38 and 44, and lead 48 is connected to electrodes 40 and 42. Thus, the electrical excitation applies oppositely directed transverse electric fields through the vibratory beam at axially spaced locations. In a manner described in detail in U.S. Pat. No. 3,479,536 entitled Piezoelectric Force Transducer which is assigned to the present assignee and is incorporated herein by reference, this described construction and electrical excitation is effective to produce vibration in the beam. It is to be understood, however, that the beam may be driven by other means, the particular one described being only representative and preferred for particular situations.

It should be noted that while the isolator masses are shown as being of rectangular cross section and as extending substantially parallel to the beam, neither is a requirement. In addition, instead of having a rectangular U-shape, the isolator masses attached to the support can form a curved U shape.

Figure 2:
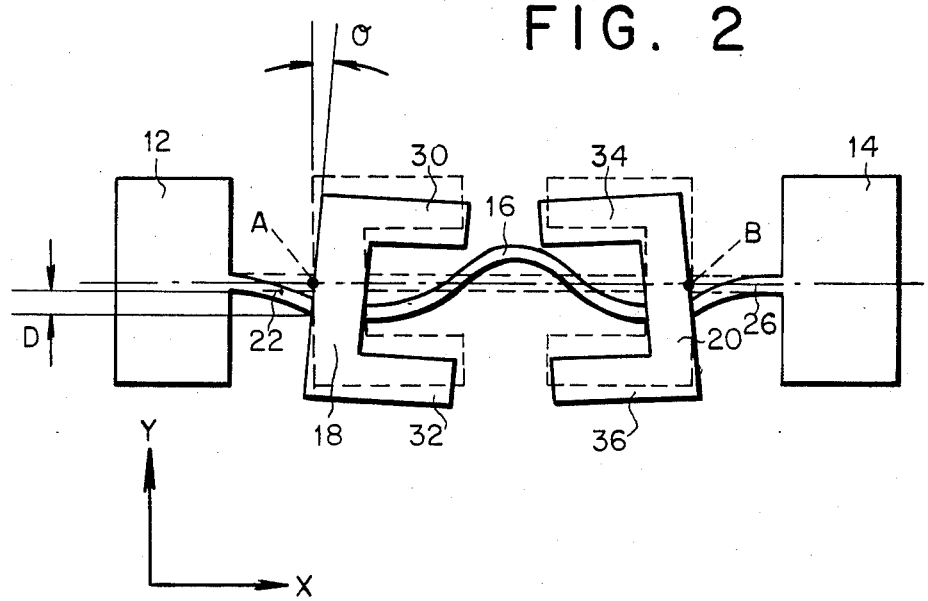
FIG. 2 is a schematic side view drawing of the vibrating system of the embodiment of the transducer of the present invention shown in FIG. 1 showing the mode of vibration of the force transducer.

Referring to the schematic side view drawing of the force transducer of the present invention shown in FIG. 2, the positions of the vibrating elements of the transducer when they are not caused to vibrate and are in their "rest" positions are shown in broken lines. The positions of the vibrating elements at one extreme of their vibrations are shown in solid lines. In order to simplify the drawing, electrodes 38, 40, 42 and 44, leads 46 and 48 and recesses 13 and 15 are not shown.

The primary vibrating system of the force transducer comprises vibratory member 16, support members 18 and 20 and isolator masses 30, 32, 34 and 36. If this primary vibratory system were suspended in space and caused to vibrate, points A and B on isolator support members 18 and 20 would move in the x- and y-directions indicated by the pair of axes shown in FIG. 2. When a single isolator spring is attached at points A and B, the motion of isolator support members 18 and 20 is restricted so that the isolator support members rotate in clockwise (and counter clockwise) through a rotation angle θ and translate vertically downward (and upward) through a distance D, both of which deflections being measured from the initial "rest" positions of the isolator support members and isolator springs. The single spring design of the present invention thus permits the isolator masses to rotate and translate. However, if double isolator springs are used as disclosed in the '400 patent, rotation of the isolator masses through the angle θ is clearly impeded by the positioning of the double isolator springs. As a result, more rotational energy will pass from the vibratory beam to the mounts in the double spring arrangement than in the single spring arrangement.

To produce an effective cancellation of moments, the isolator masses may be of any cross-sectional configuration or any configuration generally and need not extend exactly parallel to the vibratory beam. According to one embodiment of the present invention as shown in FIGS. 1 and 2, each isolator mass is exactly the same as the other isolator mass at the same end of the vibratory beam thereby resulting in a symmetric structure. Thus, the center of gravity of each pair of isolator masses at each end of the beam taken together, is located so that each is approximately in the plane of the vibratory beam.

Figure 3:
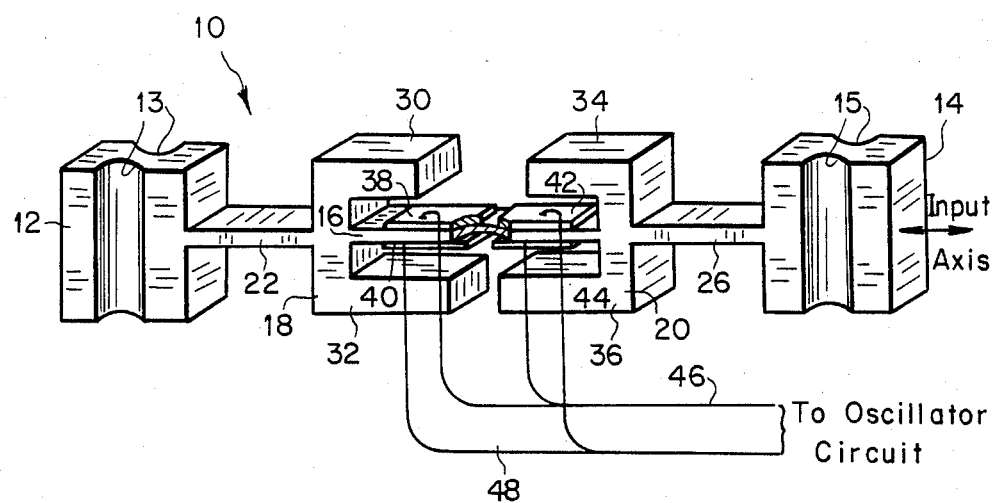
FIG. 3 is a perspective view of the vibrating beam transducer according to the present invention wherein asymmetric isolator masses are used.

Alternatively, cancellation of moments can be achieved by using isolator masses that are mismatched or asymmetric. According to this configuration, one isolator mass at one end of the beam has a different size and mass from the other isolator mass at that same beam end. As shown in FIG. 3, the size (and therefore mass) of isolator mass 30 is different from that of isolator mass 32. There are numerous ways of shaping the isolator masses to result in an asymmetric design. Similarly, the size and mass of isolator mass 34 is different from that of isolator mass 36. Although such mismatching of isolator masses can be expected to reduce the Q factor, the possibility of other effects is reduced. In particular, by mismatching the isolator masses, each isolator mass pair will be slightly detuned. As a result, it is less likely that the resonant frequency of the vibratory beam will match the resonant frequency of the isolator mass pairs which is an undesirable effect since vibratory transmission to the end mounts would be increased. The vibration of each pair of isolator masses acts as a barrier to the transmission of vibrations from the vibratory beam to the end mounts. Therefore force transducers with a high Q factor result when mismatched isolator masses and single springs are used.

While the invention has been described in conjunction with specific embodiments, it is evident that numerous alternatives, modifications, and variations will be apparent to those skilled in the art in light of the foregoing description. For example, as shown in detail in FIG. 4 of the '400 patent, the transducer can have a total of only two isolator masses each of which extending completely from one isolator spring to the other. Essentially the same isolation is achieved between the vibratory beam and end mounts; however, axial stresses, either compression or tension, applied at the end mounts are withstood by the two large isolator masses rather than by the beam so that the natural frequency of vibration of the vibratory beam remains substantially constant even when axial stresses are applied at the end mounts. Additionally, the isolation system described where a vibratory beam is the basic resonant element can also be applied to a vibrating string resonator.

What is claimed is:

1. An apparatus comprising:
    a single vibratory member having a longitudinal axis, said vibratory member being adapted to vibrate in a plane including said longitudinal axis;
    means associated with said vibratory member to maintain vibration thereof at a characteristic frequency;
    a supporting element secured to each end of said vibratory member and extending in both directions transversely of said longitudinal axis of said vibratory member;
    a pair of end mounts;

two isolator springs each having a longitudinal axis, one of said isolator springs extending between one of said end mounts and one of said supporting elements, the other of said isolator springs extending between the other of said end mounts and the other of said supporting elements, said isolator springs transmitting axial forces from said end mounts to said vibratory member along the longitudinal axis thereof; and a pair of isolator masses secured to each of said supporting elements, one at each end thereof respectively, said isolator masses being symmetrically disposed with respect to said vibratory member and one isolator mass of each pair of isolator masses being different in size and mass from the other isolator mass of the respective isolator mass pairs, said isolator springs and masses being effective to cancel the force and moment restraints produced at said end mounts whereby energy losses from said vibrating member may be prevented.

2. The apparatus of claim 1 wherein said isolator springs are attached to said supporting elements so that the longitudinal axes of said isolator springs are substantially coincident with the longitudinal axis of said vibratory member.

3. The apparatus of claim 1 wherein said vibratory member is a beam and said isolator masses generally extend along said longitudinal axis of said beam for coextensively straddling at least a portion of said beam, whereby the center of gravity corresponding to each of said pair of isolator masses is located in said plane including said longitudinal axis at a predetermined axial distance from said supporting elements.

4. The apparatus of claim 1 wherein said vibratory member is a string and the center of gravity corresponding to each of said pair of isolator masses is located in said plane including said longitudinal axis at the location where said string is secured to each of said supporting elements.

5. The apparatus of claim 1 wherein corresponding ones of said isolator masses are integrally connected to each other to form a single pair of isolator masses each one of which extending from one supporting element to the other, whereby said isolator masses prevent axial forces from being transmitted to said vibratory member.

6. The apparatus of claim 1 wherein each end mount has a pair of opposing recesses to form a pair of flexure hinges.

7. The apparatus of claim 1 wherein said apparatus is made of piezoelectric material.

8. The apparatus of claim 1 wherein said apparatus is made of quartz.

9. The apparatus of claim 1 wherein said apparatus is made of metal.

10. An apparatus comprising:
a single vibratory member having a longitudinal axis, said vibratory member being adapted to vibrate in plane including said longitudinal axis;
means associated with said vibratory member maintain vibration thereof at a characteristic frequency;
a supporting element secured to each end of said vibratory member and extending in both directions transversely of said longitudinal axis of said vibratory member;
a pair of end mounts;
two isolator springs each having a longitudinal axis, one of said isolator springs extending between one of said end mounts and one of said supporting elements, the other of said isolator springs extending between the other of said end mounts and the other of said supporting elements, said isolator springs transmitting axial forces from said end mounts to said vibratory member along the longitudinal axis thereof;
a pair of isolator means secured to each of said supporting elements, each pair being symmetrically disposed with respect to said vibratory member; wherein one isolator means of each pair is asymmetric to the other isolator means of the pair; wherein said isolator springs and means are effective to cancel the force and moment restraints produced at said end mounts to reduce or prevent energy losses from said vibrating member.

11. The apparatus of claim 10 wherein said isolator springs are attached to said supporting elements so that the longitudinal axes of said isolator springs are substantially coincident with the longitudinal axis of said vibratory member.

12. The apparatus of claim 10 wherein said vibratory member is a beam and said isolator means generally extends along said longitudinal axis of said beam for coextensively straddling at least a portion of said beam, whereby the center of gravity corresponding to each of said pair of isolator means is located in said plane including said longitudinal axis at a predetermined axial distance from said supporting elements.

13. The apparatus of claim 10 wherein said vibratory member is a string and the center of gravity corresponding to each of said pair of isolator means is located in said plane including said longitudinal axis at the location where said string is secured to each of said supporting elements.

14. The apparatus of claim 10 wherein corresponding ones of said isolator means are integrally connected to each other to form a single pair of isolator means each one of which extending from one supporting element to the other, whereby said isolator means prevent axial forces from being transmitted to said vibratory member.

15. The apparatus of claim 10 wherein each end mount has a pair of opposing recesses to form a pair of flexure hinges.

16. The apparatus of claim 10 wherein said apparatus is made of piezoelectric material.

17. The apparatus of claim 10 wherein said apparatus is made of quartz.

18. The apparatus of claim 10 wherein said apparatus is made of metal.

* * * * *